United States Patent [19]

Stewart

[11] Patent Number: 4,877,405

[45] Date of Patent: Oct. 31, 1989

[54] SYSTEM OF MODULES FOR COMPOSING ALPHANUMERICS

[76] Inventor: Mark R. Stewart, 60 Pleasant St. #2, Cambridge, Mass. 02139

[21] Appl. No.: 165,180

[22] Filed: Mar. 7, 1988

Related U.S. Application Data

[63] Continuation of Ser. No. 911,219, Sep. 24, 1986, abandoned.

[51] Int. Cl.$^4$ ............................................. G09B 1/00
[52] U.S. Cl. ........................................ 434/160; 52/105; 52/311
[58] Field of Search ................. 434/96, 156, 157, 159, 434/160; 273/156, 157 R; 40/447; 52/105, 311

[56] References Cited

U.S. PATENT DOCUMENTS

| | | | |
|---|---|---|---|
| D. 24,140 | 8/1895 | Crandall | D18/26 |
| D. 34,848 | 7/1901 | Norden | D18/26 |
| D. 34,849 | 7/1901 | Norden | D18/26 |
| D. 101,243 | 9/1936 | Rustad | D18/26 |
| D. 184,396 | 2/1959 | Jenkins | D21/108 |
| 257,630 | 8/1882 | Whitney | 434/160 |
| 713,638 | 6/1902 | Hepfinger | 434/160 |
| 755,272 | 6/1904 | Burnham | 40/450 |
| 1,091,335 | 2/1912 | Herrmann | 40/451 |
| 1,119,309 | 7/1914 | Nordman | 273/157 R |
| 1,452,340 | 6/1920 | Hubbard | 434/160 |
| 1,660,254 | 8/1926 | Carroll | 40/451 |
| 1,965,874 | 5/1931 | Appold | 40/452 |
| 1,973,564 | 9/1934 | Graham | 434/96 |
| 2,114,678 | 6/1934 | Funk | 315/184 |
| 2,145,946 | 6/1935 | Morrissey | 40/611 |
| 3,075,304 | 6/1961 | Votolato | 434/160 |
| 3,106,696 | 9/1963 | Foley | 340/825.26 |
| 3,759,526 | 7/1973 | Estvan, Jr. | 273/157 R |
| 3,827,043 | 7/1974 | Maezawa | 340/756 |
| 3,971,012 | 4/1976 | Morokawa et al. | 340/765 |
| 4,167,005 | 2/1979 | Beauviala | 340/762 |
| 4,344,626 | 4/1982 | Wadland | 273/243 |
| 4,428,732 | 1/1984 | Meyer | 434/160 |
| 4,489,513 | 9/1984 | Reiner | 40/447 |
| 4,508,347 | 4/1985 | Shettler | 273/157 R |

FOREIGN PATENT DOCUMENTS

| | | | |
|---|---|---|---|
| 1429433 | 12/1966 | France | 273/156 |
| 655013 | 3/1986 | Switzerland | 273/157 R |

*Primary Examiner*—David A. Scherbel
*Assistant Examiner*—Michele A. Van Patten

[57] ABSTRACT

A system of composing alphanumeric characters and/or decorative designs from modules containing line segments. There are eight different module types (I-VIII), each different module type containing a differently shaped or positioned line segment. Most characters are formed by placing six modules in an array of three high by two wide; those of the module types which are needed to create the desired character are used in the array. Some character require an array only three modules high, while others require an array of three modules high by three modules wide. This embodiment has application in the fields of signage, tiling, games, and educational toys.

In another embodiment a system for composing alphanumeric characters and/or decorative designs from compound modules is provided. These compound modules, (XI, XII), are formed by superimposing some of the lines of the eight different module types in one module and then making these lines differentially visible through such means as a LED, LCD, gas-discharge tube, etc.

21 Claims, 6 Drawing Sheets

FIG. 1
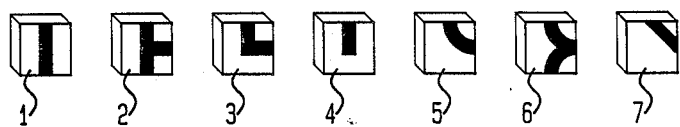
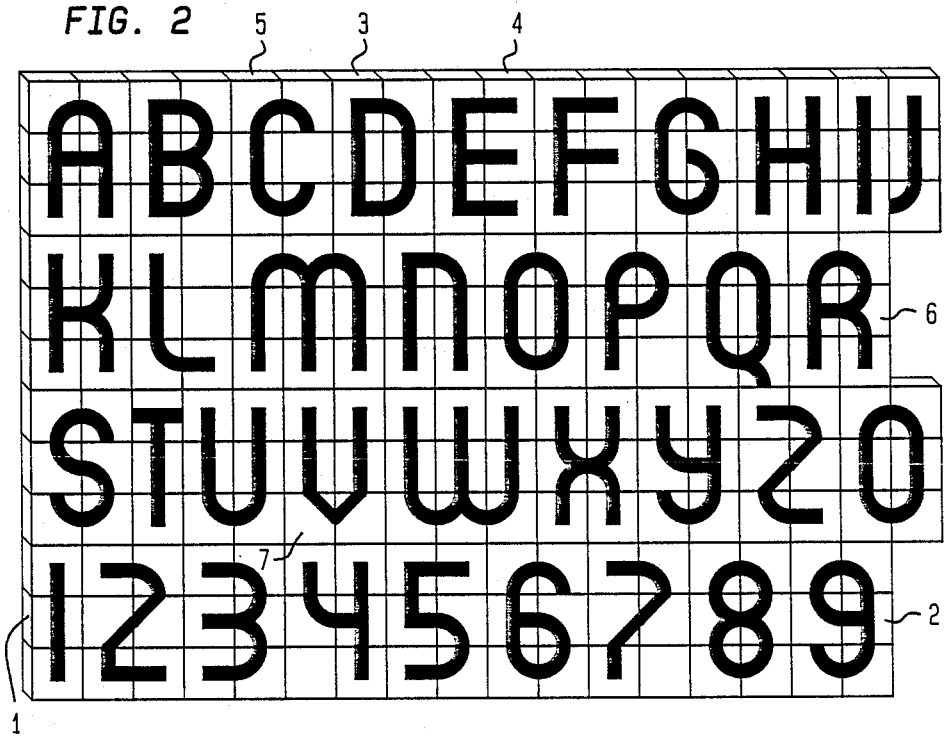
FIG. 2

SYSTEM OF MODULES FOR COMPOSING ALPHANUMERICS

This is a continuiation of application Ser. No. 06/911,219, filed Sept. 24, 1986, now abandoned.

BACKGROUND—FIELD OF INVENTION

This invention is a means for composing alphanumeric symbols and/or decorative patterns for line segments.

BACKGROUND—DISCUSSION OF THE PRIOR ART

Many methods for composing alphanumeric symbols (letters and numbers, hereinafter "alphanumerics") from line segments exist. However, each one of these systems has its limitations and, as a result, most of these systems have never been commercially utilized. Those few systems that have been used commercially have been used only in a specific field, e.g., in games, educational apparatus, signage with illuminable or reflective materials, or signage with non-illuminable materials.

Some of the limitations that have precluded or restricted commercial viability of these systems are as follows:

(1) Some systems construct alphanumerics with so many different line segments that little economy is gained, e.g., U.S. Pat. No. 2,145,946 to Morrissey, 2/7/39; U.S. Pat. No. 3,759,526 to Estvan, Jr., 9/18/73; U.S. Pat. No. 4,489,513 to Reiner, 12/24/84, U.S. Pat. No. 4,508,347 to Shettler, 4/2/85; and Swiss Pat. No. 655,013 to Hotz, 3/27/86.

(2) Other systems use line segments which must be overlapped to form some letters and not others, thus creating three-dimensional problems, e.g. U.S. Pat. No. 4,344,626 to Wadland, 8/17/82.

(3) Some systems use line segments or shapes that are freestanding and of different sizes. This creates difficulties in attachment when the system is used in signage, e.g., U.S. Pat. No. 1,119,309 to Nordman, 12/1/14; U.S. Pat. No. 257,630 to Whitney, 5/9/1882.

(4) Systems in use to illuminable or reflective signs require a rectangle of differentially-lit line segments and are thus useful only in that field, e.g. U.S. Pat. No. 3,106,696 to Foley, 10/8/63; and U.S. Pat. No. 3,971,012 to Morokawa et al, 7/20/76.

(5) Some systems are not able to create all of the alphanumerics and thus fail to be utilizable, e.g., U.S. Pat. No. 1,973,564 to Graham, 9/11/34.

Moreover, none of the systems for composing alphanumerics from line segments can be used to create decorative patterns in conjunction with, or in addition to, the alphanumerics.

OBJECTS AND ADVANTAGES

The present invention eliminates all of the difficulties mentioned above. Specifically, it is economical, it eliminates the need for overlapping line segments, for line segments of varying sizes, for restriction to either illuminable or reflective displays, and it creates all the alphanumerics.

As a result, the invention can be utilized in signage and a variety of other fields and systems, e.g., in games (educational and recreational), other educational apparatus, illuminable, reflective or non-illuminable signage, toys, etc.

Further objects and advantages will be apparent from a consideration of the accompanying drawings and ensuing description.

BRIEF DESCRIPTION OF THE DRAWINGS

FIG. 1 is a perspective view of seven modules used to create alphanumerics and/or decorative designs in a round or square style, in accordance with the invention.

FIG. 2 is a perspective view of an assemblage of alphanumerics in a round font style created by assembling the modules of FIG. 1.

DETAILED DESCRIPTION OF THE INVENTION

FIG. 1—INDIVIDUAL MODULES

Figure 3:
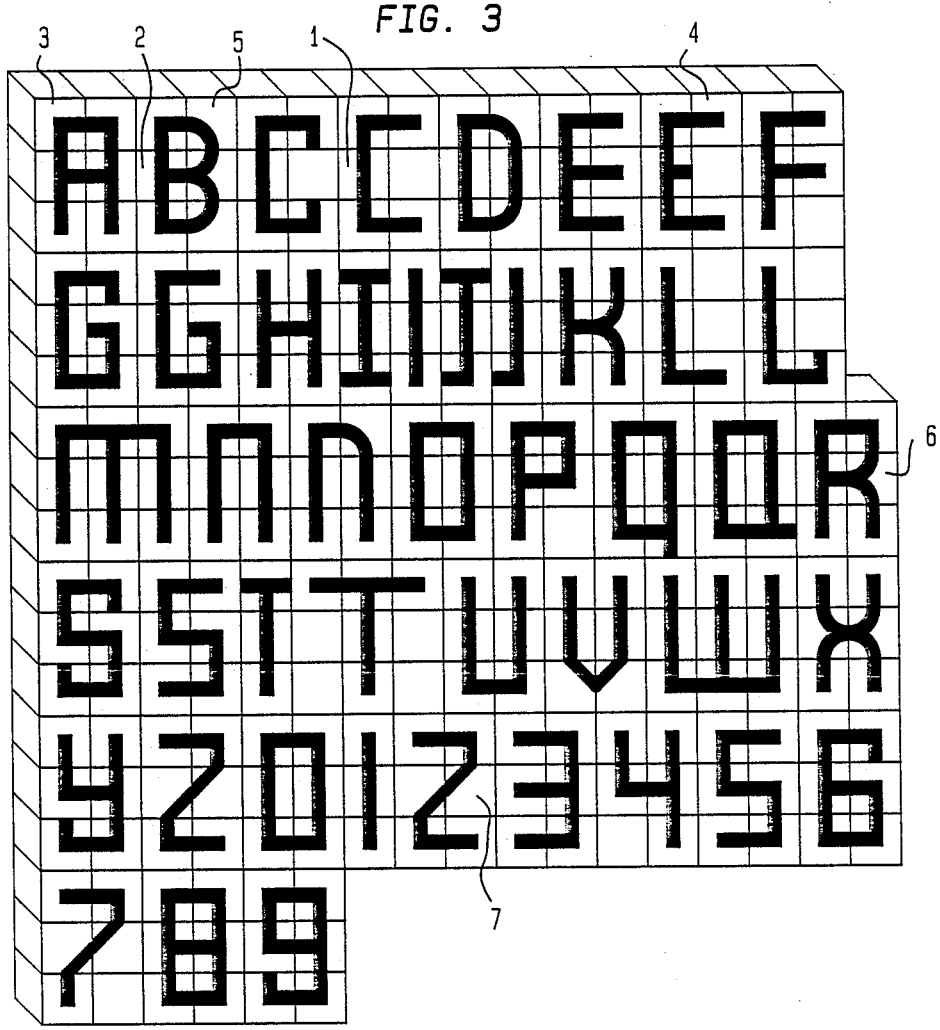
FIG. 3 is a perspective view of an assemblage of the alphanumerics in a square font style created by assembling the modules of FIG. 1.

In accordance with the invention, alphanumeric symbols are composed by assembling them from a fixed group of rectangular modules of identical size, but with different lines thereon. FIG. 1 illustrates a group of seven modules that are used for forming alphanumerics and/or decorative designs in accordance with a preferred embodiment of the invention.

Module 1 consists of a rectangle having a contrasting straight line transversing the rectangle from the midpoint of one edge to the midpoint of the opposite edge.

Module 2 consists of a rectangle having a contrasting straight line transversing the rectangle from the midpoint of one edge to the midpoint of the opposite edge, and another straight line bisecting the first line at a right angle and extending to an edge not bisected by the first straight line.

Module 3 consists of a rectangle having two contrasing straight line segments, each originating at the midpoint of adjacent edges of the rectangle and meeting at a right angle in the center of the rectangle and terminating there.

Module 4 consists of a rectangle having a contrasting straight line originating at the midpoint of one edge of the rectangle and at right angle to that edge and terminating in the center of that rectangle.

Module 5 consists of a rectangle having a contrasting curved line with ends at the midpoints of two adjacent edges of the rectangle and describes an arc contained within one quadrant of that rectangle.

Module 6 consists of a rectangle having two contrasting curved lines; each originates at the midpoints of opposite edges and describes an arc that extends from those midpoints to the midpoint of the edge between those opposite edges; each arc is contained within adjacent quadrants of the rectangle.

Module 7 consists of a rectangle having a contrasting straight line that extends from the midpoint of one edge to the midpoint of an adjacent edge; this line meets both edges at a 45 degree angle.

While the ends of all lines in these modules extend from the midpoint of a side of their rectangle, many other points between the ends of such sides could alternately be used, at some sacrifice of flexibility.

Additionally, though all modules are shown here as rectangles, other regular polygons can also be used in their place. Specifically, those regular polygons that are essentially squares with cut-off corners, e.g., octagons, dodecahedrons, etc., would form identical modules to those illustrated here except for their slightly variant shape. Other polygons whose shape do not approximate rectangles, e.g. hexagons, can also be used to form the modules in slightly variant forms.

FIG. 2—ASSEMBLED ALPHANUMERICS

The modules in FIG. 1 can be used to form any alphanumeric in a round graphic font style, as illustrated in FIG. 2. For example, to form a "B", I use six modules of four different types: two modules 3's in the upper and lower lefthand corners, one module 2 in the middle lefthand position, two module 5's in the upper and lower righthand corners, and one module 6 in the middle righthand position.

Similarly, all the letters of the Latin alphabet and the Arabic numbers can be formed by the use of the modules, the procedure usually requiring the use of six modules of one to four types, as illustrated. Certain alphanumerics may be formed by the use of only three modules, such as "I", "J", "T"and "1", and other alphanumerics require the use of nine modules, such as "M" and "W", as illustrated in FIG. 2. Since the manner of assembling the modules of FIG. 1 so as to form the other alphanumerics can be easily discerned from FIG. 2, it will not be described in detail.

The modules can be constructed of any durable material, such as wood, ceramic, metal, or plastic. They can be constructed in any size to yield a letter size appropriate to the desired use. The actual height of the modules which form any letter will be thrice the height of any one module and the actual width of such modules will be twice the width of any one module. The height and width of the letters per se will be twice the same, respectively, as that of any module. The modules, by virtue of the unadorned space within them, will create the proper letter spacing when words are written. The line segments in the modules can be distinguished from the background either by color, texture, height (intaglio or relief, opacity, etc., or by any combination of these factors).

In one example, I constructed the modules of ceramic tile, five cm. × five cm. × one-half cm. thick. The lines on the modules were one cm. wide so that the alphanumerics assembled from the modules were ten cm. high and five cm. wide. The tiles had a white background and the line segments were blue; the result was alphanumerics easy to read at a distance of about ten meters.

FIG. 3—ASSEMBLED ALPHANUMERICS

FIG. 3 illustrates another graphic style of alphanumerics, a square font style, formed by using the same seven modules in combinations of six, once again using one to four types of module per alphanumeric. It should be noted that some letters appear in more than one form, i.e., various alternative forms of letters are illustrated. For example. "C", "G", "L", "S" and other letters are illustrated in both serif and sans-serif styles. Other variant forms of letters are not illustrated but are fashionable from these same modules within the scope of the invention.

FIGS. 4 & 5—INDIVIDUAL MODULES & ASSEMBLED ALPHANUMERICS

Figures 4, 5:
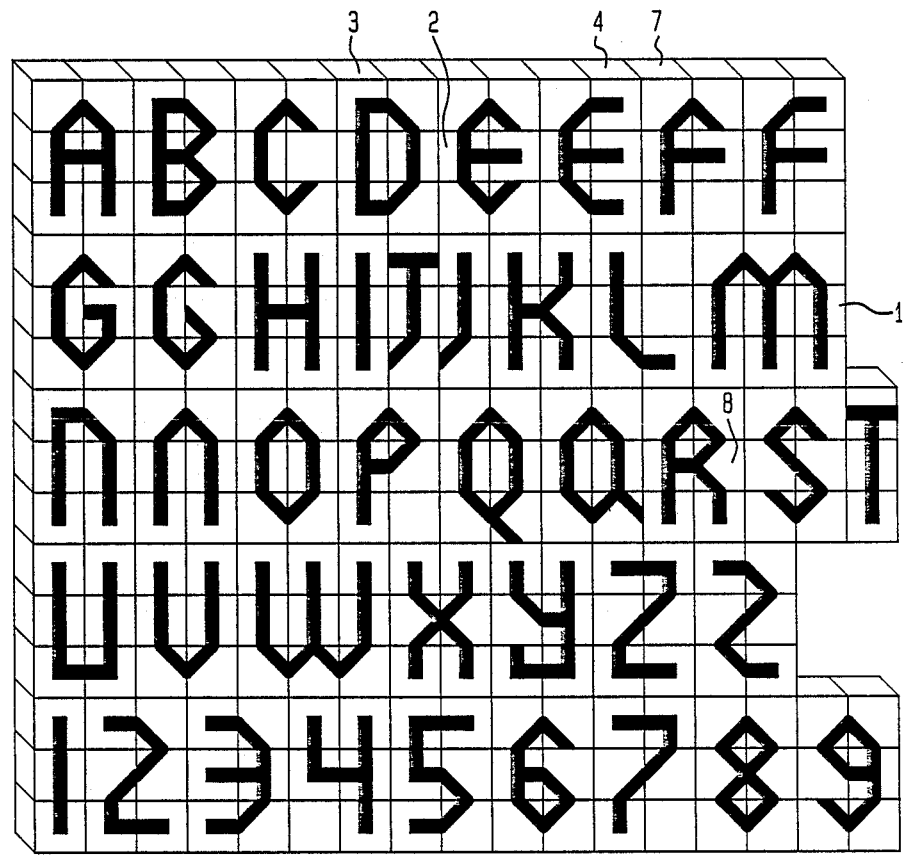
FIG. 4 is a perspective view of additional modules related to the creation of alphanumerics in a gothic font style.
FIG. 5 is a perspective view of an assemblage of the alphanumerics in a gothic font style using the modules of FIGS. 1 & 4.

FIG. 4 illustrates an additional module 8 that can be substituted for modules 5 and 6 of FIG. 1. The module "bank" is now reduced from seven to six modules. This module "bank" can be used to assemble alphanumerics in a gothic graphic font style illustrated in FIG. 5. Module 8 consists of two straight lines both originating at the midpoint of one edge of a rectangle and extending at 45 degree angles in opposite directions to the midpoints of two opposite edges of the rectangle.

FIG. 6—ELONGATED MODULES

Figure 6A:
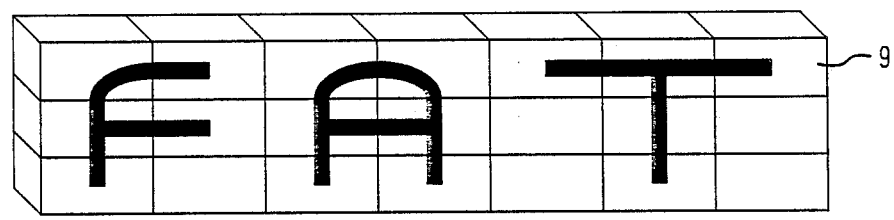
FIG. 6 (parts a & b) are perspective views of words written in an elongated and a compressed fashion by using modules having a non-square rectangular shape.
Figure 6B:
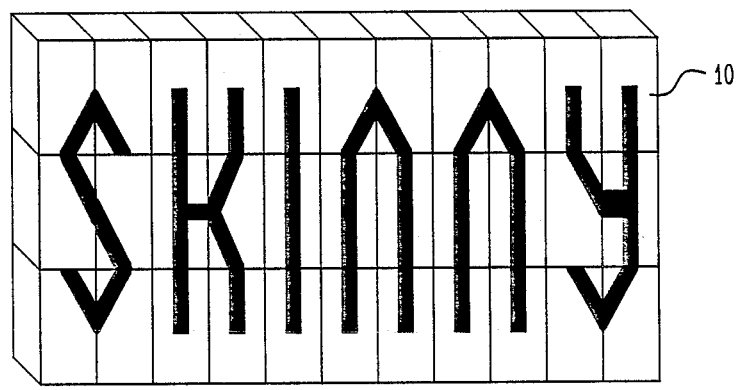

FIG. 6 (parts a & b) illustrates that the rectangular modules need not be square for the system to function properly. As shown, the module rectangles are elongated along their horizontal edges, such as 9, so as to create a squat graphic look (FIG. 6a), or they may be elongated along their vertical edges, such as 10, so as to create a tall graphic style (FIG. 6b).

FIG. 7—FIGURATIVE & DECORATIVE DESIGNS

Figure 7A:
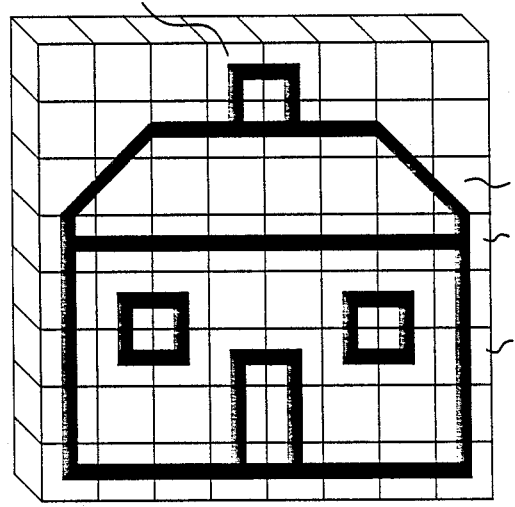
FIG. 7 (parts a, b, & c) are perspective views of figurative and decorative designs created by use of the modules illustrated in FIGS. 1 and 4.
Figure 7B:
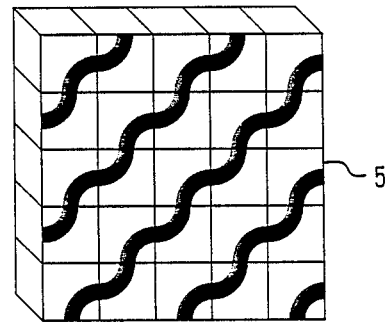
Figure 7C:
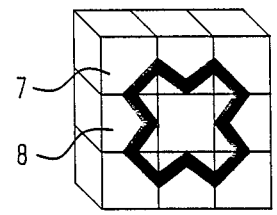

FIG. 7 illustrates a few of the many figurative or decorative designs that may be created by combining the modules in various ways. FIG. 7a illustrates a house drawn by assembling modules 1, 2, 3 and 7. FIG. 7b illustrates a wave pattern created by the repetitious use of module 5. FIG. 7c illustrates a cross created by use of modules 7 and 8. These illustrations of figurative and decorative designs are examples only and are not meant to limit the invention to these specific designs. All designs fashionable with the modules are included in this invention.

FIG. 8—COMPOUND MODULES

Figure 8:
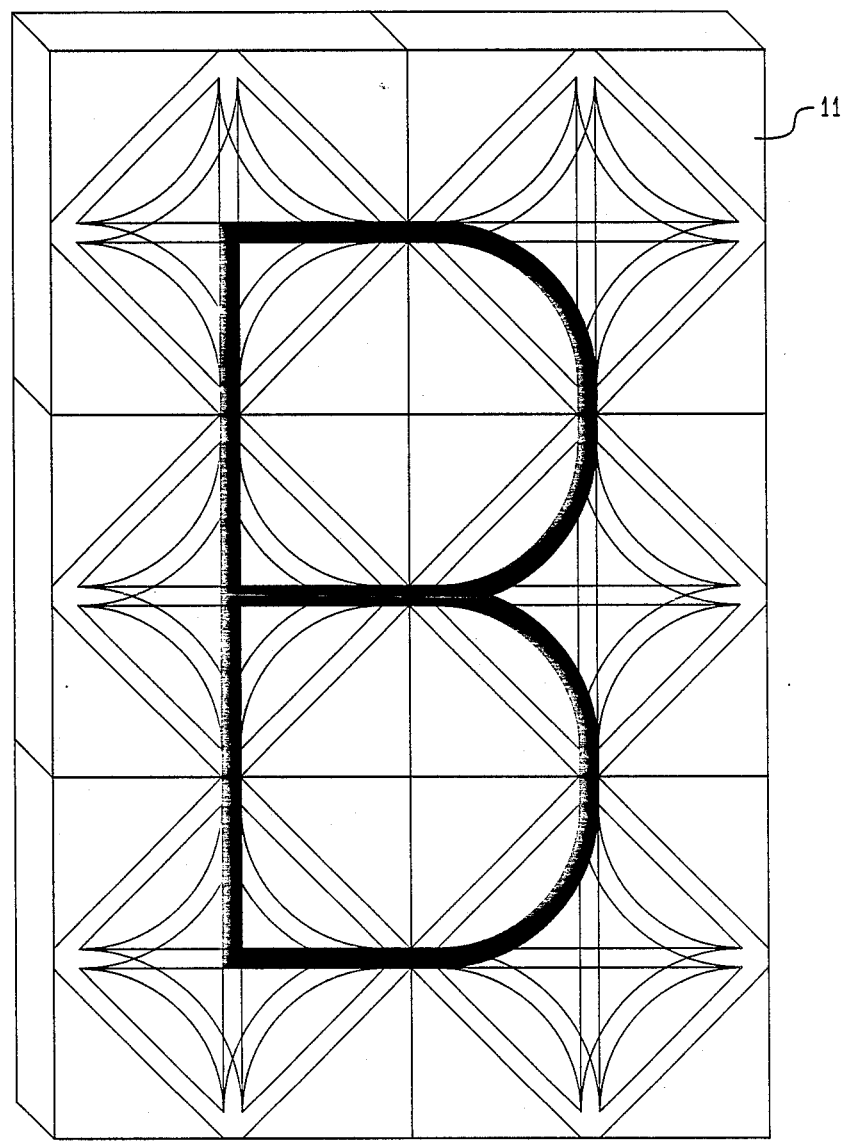
FIG. 8 is a perspective view of an alphanumeric character formed by assembling six identical compound modules.

FIG. 8 is an illustration of the letter "B" in the round graphic style created by the use of six identical modules 11, each of which has line segments that can selectively be made visible. Each module is effectively created by superimposing all of the lines from modules types 1–7 upon one another in one compound module. Moreover, every one of the seven line segment patterns must be reproduced at every 90 degree orientation of the compound module. This is done so that the compound module can create any of the line segment patterns of modules 1–7 regardless of its position within an array of compound modules.

By fashioning the line segments contained in these modules of some illuminable or reflective materials such as gas-discharge tubes, liquid crystal displays, light-emitting diodes, laser sensitive displays, etc, and by providing electrical circuitry that can differentially make visible these materials, one can effectually create any one of the modules illustrated in FIG. 1. For example, the module in the upper lefthand corner of FIG. 8 has the lines of module 3 made visible; the other line segments are left invisible. By using the compound modules illustrated in FIG. 8, one can create alphanumerics in any one of the three graphic styles.

FIG. 9—COMPOUND MODULES

Figure 9:
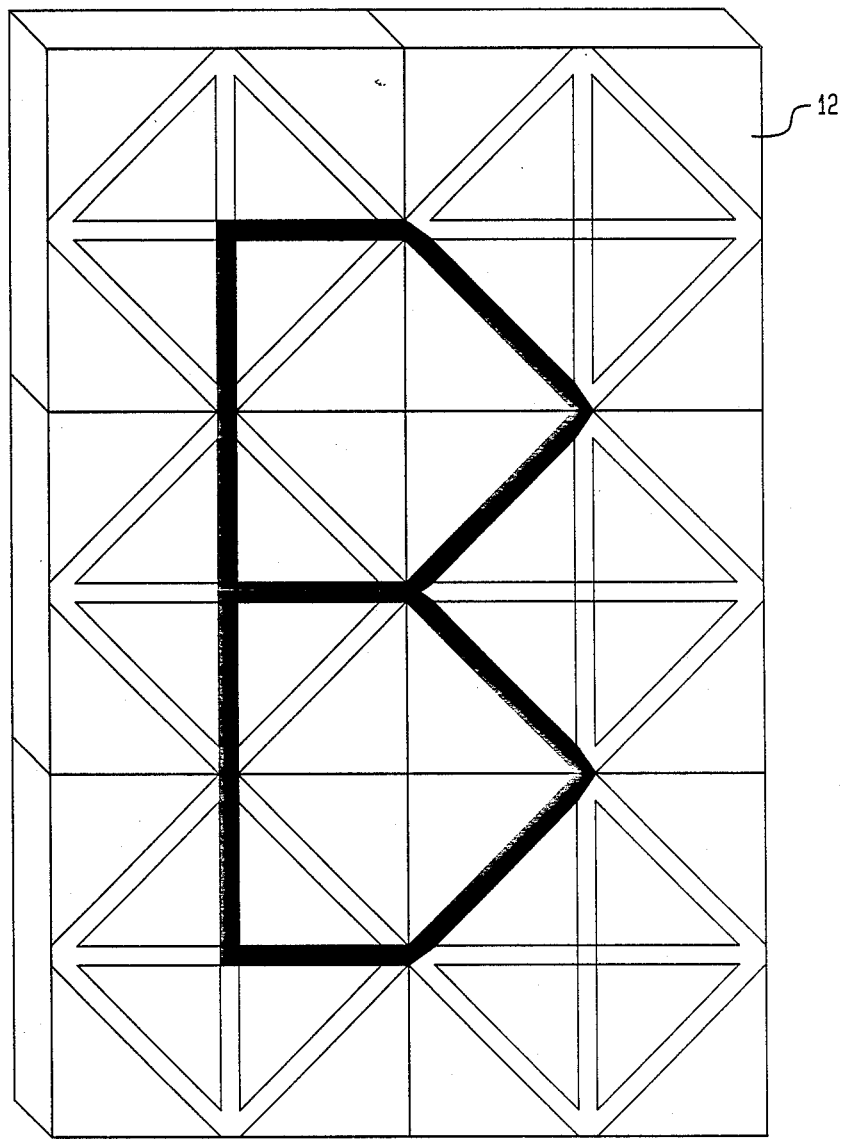
FIG. 9 is a perspective view of an alphanumeric character formed by assembling six identical compound modules with a line configuration different from those of FIG. 8.

FIG. 9 is similar to FIG. 8, differing only in that each compound module 12 is created from the six module types illustrated in FIG. 1, as modified by FIG. 4. I.e., the line segment paterns of modules 1, 2, 3, 4, 7, and 8 are superimposed upon each other and reproduced in every 90 degree orientation of each module 12. Thus the graphic style that can be created by this type of module is limited to the gothic style. The advantage over the module of FIG. 8 is that this module has fewer line segments and is thus more economical to produce and operate.

OPERATION OF THE INVENTION

The modules described above can be used to create alphanumerics and decorative designs. These have utility in the manufacture of signage, both of the illuminable or reflective and non-illuminable or reflective types, and for use as a toy or game, for educational and recreational purposes.

Signage of the non-illuminable or reflective type can be manufactured and constructed according to the modules and graphic styles illustrated in FIGS. 1-7. In use, the modules would be manufactured as ceramic tiles according to the designs shown, and these would be used in any situation where ceramic tiles would ordinarily be used. An additional advantage is the capability of creating both signage and decorative designs of the same material and style as the rest of the tiled surface. This would be useful in any building with high traffic where permanent, durable, flush-mounted signage would be advantageous, e.g., train stations, airports, hospitals, universities, etc.

Signage not meant to be permanently affixed to a surface could also be created by use of these modules in several different ways. Similar tiles as described above, of ceramic or other durable material, could be permanently affixed to a transportable backing and this backing could then be affixed to the surface where the sign was desired. Alternately, a backing with a device for temporarily affixing the modules could be manufactured. In this case the modules might be affixed to the backing with magnets, multiple hook and loop fasteners, small male and female fittings, etc. This would permit the modules to be applied and removed as needed. These semi-permanent and interchangeable signs would be useful in any situation where information displays are frequently changed, e.g., stores, transportation centers, etc.

Thus, the ability to create permanent, semi-permanent or interchageable signage of the non-illuminated variety is included in the commercial potential of this invention. The possibilities of application are broadly outlined here and any signage device not specifically mentioned yet employing the specific modules described here is clearly within the scope of the present invention.

Compound modules, as illustrated in FIGS. 8 and 9, could be of liquid crystal, light-emitting diode, gas-discharge tube, or laser-sensitive materials. They would be useful in any of the applications in which other line segment-composed alphanumerics are now used. In addition, because of the choice of graphic styles available from the design of the invention and the identifiability of the alphanumerics composed, the invention would expand the use of line segment-composed alphanumerics to situations in which they are now not commonly used. For example, the invention would be useful in a situation where a more elegant graphic style, a choice of graphic styles and/or a larger format were desired.

Besides the use of the present invention in signage, there is also the potential for use of the modules as a game or toy for educational and/or recreational purposes. Modules of the type illustrated in FIGS. 1 and 4 would be manufactured of some durable material such as wood, plastic, or rubber. The basic rules of play are as follows: Each player would have a turn and during that turn would have to take from the store of modules in his or her posession and add to the word, number, or figurative or decorative design being formed by all the players. Other variations on the rules of play will be envisioned. This game might be used in school classrooms to help children advance their creative and synthetic abilities and to test them, or impaired adults, in those abilities. It would also be useful in teaching new words and group cooperation. No apparatus other than the modules themselves would be necessary for the playing of the game.

The uses of the invention outlined in this section are examples and not meant to be exhaustive. Any other uses of the modules of the invention is included within its scope.

CONCLUSIONS, RAMIFICATIONS AND SCOPE

It can be seen that the system for composing alphanumeric symbols according to my invention substantially advances the present technology in the field. The invention accomplishes this by modularizing the line segments needed to compose any alpahnumeric symbol and by limiting to a small number the bank of those modules needed. This modularization creates the possibility of using this specific system of composing alphanumerics in a few different fields. Other systems are confined to the field of signage of a specific variety or of games. This invention permits the use of these modules in a variety of different types of signage, for these types of signage to be used in combination with each other and in combination with decorative elements also created by the modules.

Specifically as regards signage, the invention permits the use of both illuminable or reflective and non-illuminable materials in displays without obligation to change graphic styles. Also, this new system has the ability to create decorative patterns, thereby permitting signage and decorative elements to be incorporated into a single display while adhering to one graphic style. Thus, in a sophisticated usage of the system, one could obtain a combination of decorative and alphanumeric elements, some of which were to be illuminable or reflective and some not, all in one coherent graphic style.

As indicated, the invention is not limited to signage but can also be used to create educational games and testing devices. The invention also can be used to create a game used mostly for recreational purposes.

Also, the modules of the invention can be altered in a variety of ways within the inventor's scope. For example, the modules might be manufactured of clear transparent blocks with the line segments being made opaque, translucent, or tinted and transparent. Or, the modules might be made in a polygonal form other than a rectangle using the same or essentially the same line segments.

Therefore, the examples of use in the fields of signage, decoration, and education cited here are examples only and not meant to be exhaustive. Accordingly, the scope of the invention should be determined not by the examples given, but by the appended claims and their legal equivalents.

I claim:

1. A system of modules for constructing alphanumeric characters and decorative and figurative designs by assembling such modules in a coplanar array, comprising:

a group of modules, each being shaped so that said modules can be assembled in a coplanar array in an adjacent manner, each module having a major surface circumscribed by a plurality of straight edges, each module having at least one line segment thereon which extends from a fixed point on at least one of said straight edges intermediate the ends thereof and which contrasts with the rest of said major surface, said modules being of seven different types and having respectively seven different line segment patterns thereon, said seven different line segment patterns having the following configurations:

(a) a straight line transversing said major surface from a point between the ends of one edge to an opposite edge, (b) a straight line transversing said major surface from a point between the ends of one edge to an opposite edge and another straight line extending from a point between the ends of said first straight line at approximately a right angle to said line and extending to an edge not intersected by said first straight line, (c) two straight line segments, each originating at a point between the ends of two adjacent edges and meeting at approximately a right angle at a point spaced from the edges of said major surface, (d) a straight line originating at a point between the ends of one edge and extending at approximately a right angle to such edge, said line segment terminating at a point spaced from the edges of said major surface, (e) a curved line having an end at a point between the ends of each of two adjacent edges, said curved line providing an arc which contains substantially one quadrant of said major surface, (f) two curved lines, each originating at a point between the ends of each of two opposite edges and providing an arc from said points to a point between the ends of one edge between said opposite edges, each said arc substantially containing an adjacent quadrent of said major surface, and (g) a straight line extending from a point substantially in the middle of one edge to a point substantially in the middle of an adjacent edge, said line extending at an angle of approximately 45 degrees to each of said edges, and such that said line will line up with any line on any of said modules, whereby, by using only said seven types of modules, one can form any Latin alphabetic character or any Arabic numeral in a coplanar array.

2. The system of claim 1 wherein a plurality of said modules are assembled in a coplanar array so as to form a plurality of alphanumeric characters.

3. The system of claim 2 wherein said alphanumeric characters are constructed with said modules so that certain corners of said alphanumeric characters are rounded, thereby creating a rounded font.

4. The system of claim 2 wherein said alphanumeric characters are constructed with said modules so that certain corners of said alphanumeric characters are square, thereby creating a square font.

5. The system of claim 2 wherein said line segments on said modules contrast with the rest of said major surface on said modules by a characteristic selected from a group consisting of color, texture, relief, intaglio, and a combination of these characteristics.

6. The system of claim 2 wherein said modules are constructed of a hard material, said modules being permanently affixed to a surface, so as to create a permanent informational and decorative display.

7. The modules of claim 2 wherein said modules include means for affixing them temporarily and interchangeably on a surface, thereby creating an interchangeable informational and decorative display device.

8. A system of modules for constructing alphanumeric characters and decorative and figurative designs by assembling such modules in a coplanar array, comprising:

a group of modules, each being shaped so that said modules can be assembled in a coplanar array in an adjacent manner, each module having a major surface circumscribed by a plurality of straight edges, each module having at least one line segment thereon which extends from a fixed point on at least one of said straight edges intermediate the ends thereof and which contrasts with the rest of said major surface, said modules being of six different types and having respectively six different line segment patterns thereon, said six different line segment patterns having the following configurations:

(a) a straight line transversing said major surface from a point between the ends of one edge to an opposite edge, (b) a straight line transversing said major surface from a point between the ends of one edge to an opposite edge and another straight line extending from a point on said first straight line from a point between the ends thereof at approximately a right angle to said line and extending to an edge not bisected by said first straight line, (c) two straight line segments, each originating at a point between the ends of two adjacent edges and meeting at approximately a right angle at a point spaced from the edges of said major surface, (d) a straight line originating at a point between the ends of one edge and extending at approximately a right angle to such edge, said line segment terminating at a point spaced from the edges of said major surface, (e) a straight line extending from a point substantially in the middle of one edge to a point substantially in the middle of an adjacent edge, said line extending at an angle of approximately 45 degrees to each of said edges, and such that said line will line up with any line on any of said modules, (f) two straight line segments, each origination at a point between the ends of one edge and extending a angles of approximately 45 degrees to a point between the ends of opposite edges, whereby, by using only said seven types of modules, one can form any Latin alphabetic character or any Arabic numeral in a coplanar array.

9. The system of claim 8 wherein a plurality of said modules are assembled in a coplanar array so as to form alphanumeric characters.

10. The system of claim 9 wherein said alphanumeric characters are constructed with said modules so that certain corners of said alphanumeric characters are of acute angles, thereby creating a gothic font.

11. The system of claim 9 wherein said line segments contrast with the rest of said major surface by a characteristic selected from the group consisting of color, texture, relief, intaglio, and a combination of these characteristics.

12. The system of claim 9 wherein said modules are constructed of a hard material, said modules being permanently afffixed to a surface, so as to create a permanent informational and decorative display.

13. The modules of claim 9 wherein said modules include means for affixing them temporarily and interchangeably on a surface, thereby creating an interchangeable informational and decorative display device.

14. A system of modules for constructing alphanumeric characters and decorative and figurative designs by assembling such modules in a coplanar array, comprising:

a group of modules, each being shaped so that said modules can be assembled in a coplanar array in an adjacent manner, each module having a major surface circumscribed by a plurality of straight edges, each module having at least one line segment thereon which extends from a fixed point on at least one of said straight edges intermediate the ends thereof and which contrasts with the rest of said major surface, said modules being of eight different types and having respectively eight different line segment patterns thereon, said eight different line segment patterns having the following configurations:

(a) a straight line transversing said major surface from a point between the ends of one edge to an opposite edge.

(b) a straight line transversing said major surface from a point between the ends of one edge to an opposite edge and another straight line extending from a point between the ends of said first straight line at approximately a right angle to said line and extending to an edge not intersected by said first straight line, (c) two straight line segments, each originating at a point between the ends of two adjacent edges and meeting at approximately a right angle at a point spaced from the edges of said major surface, (d) a straight line originating at a point between the ends of one edge and extending at approximately a right angle to such edge, said line segment terminating at a point spaced from the edges of said major surface, (e) a curved line having an end at a point between the ends of each of two adjacent edges, said curved line providing an arc which contains substantially one quadrant of said major surface, (f) two curved lines, each originating at a point between the ends of each of two opposite edges and providing an arc from said points to a point between the ends of one edge between said opposite edges, each said arc substantially containing an adjacent quadrent of said major surface, and (g) a straight line extending from a point substantially in the middle of one edge to a point substantially in the middle of an adjacent edge, said line extending at an angle of approximately 45 degrees to each of said edges, and such that said line will line up with any line on any of said modules, (h) two straight line segments, each origination at a point between the ends of one edge and extending a angles of approximately 45 degrees to a point between the ends of opposite edges.

whereby, by using only said seven types of modules, one can form any Latin alphabetic character or any Arabic numeral in a coplanar array.

15. The system of claim 14 wherein a plurality of said modules are assembled in a coplanar array so as to form a plurality of alphanumeric characters.

16. The system of claim 15 wherein said alphanumeric characters are constructed with said modules so that certain corners of said alphanumeric characters are rounded, thereby creating a rounded font.

17. The system of claim 15 wherein said alphanumeric characters are constructed with said modules so that certain corners of said alphanumeric characters are square, thereby creating a square font.

18. The system of claim 15 wherein said alphanumeric characters are constructed with said modules so that certain corners of said alphanumeric characters are of acute angles, thereby creating a gothic font.

19. The system of claim 15 wherein said line segments on said modules contrast with the rest of said major surface on said modules by a characteristic selected from a group consisting of color, texture, relief, intaglio, and a combination of these characteristics.

20. The system of claim 15 wherein said modules are constructed of a hard material, said modules being permanently affixed to a surface, so as to create a permanent informational and decorative display.

21. The modules of claim 15 wherein said modules include means for affixing them temporarily and interchangeably on a surface, thereby creating an interchangeable informational and decorative display device.

* * * * *